United States Patent [19]
Johnson

[11] Patent Number: 5,733,582
[45] Date of Patent: Mar. 31, 1998

[54] APPARATUS FOR SUPPORT OF LARGE SHIPPING CONTAINERS DURING FOAMING

[75] Inventor: Darrell N. Johnson, Stillwater, Minn.

[73] Assignee: Con-Tek Machine, Inc., St. Paul, Minn.

[21] Appl. No.: 385,755

[22] Filed: Feb. 8, 1995

[51] Int. Cl.$^6$ .................................................. B29C 39/10
[52] U.S. Cl. .................. 425/110; 264/46.4; 264/259; 269/48.1; 269/50; 269/287; 414/498; 414/779; 425/125; 425/169; 425/425; 425/817 R
[58] Field of Search ................. 425/110, 817 R, 425/424, 425, 117, 125, 169; 264/46.5, 261, 262, 259, 46.4; 269/48.1, 50, 51, 287; 414/498, 778, 779, 754

[56] References Cited

U.S. PATENT DOCUMENTS

| | | | |
|---|---|---|---|
| Re. 27,593 | 3/1973 | Gondeck et al. | 264/46.5 |
| 3,877,856 | 4/1975 | Valentini | 425/110 |
| 3,880,415 | 4/1975 | Fujioka et al. | 425/110 |
| 4,370,795 | 2/1983 | Reidenbach | 425/110 |
| 4,411,413 | 10/1983 | Reidenbach | 269/48.1 |

*Primary Examiner*—Jay H. Woo
*Assistant Examiner*—Joseph Leyson
*Attorney, Agent, or Firm*—Moore & Hansen

[57] ABSTRACT

Apparatus for supporting a large oceanic type shipping container while applying fluid foam insulation to the container. The apparatus utilizes a stationary frame which supports a housing, the housing having an open ended foaming chamber in which a mandrel is cantileverly mounted. Heated platens are mounted to the mandrel and housing. At least some of the platens are movably mounted and capable of engaging the container when the container is within the chamber. The container is moveable into and out of the housing chamber by use of a carriage movably supported on a guide base. The housing is swingably mounted so that it may be pivoted relative to the frame and relative to a horizontal plane, allowing increased foaming efficiency of the container's cavities. After foaming, a void detection system having thermal sensors with scanning capability allows detection of inadequately insulated voids within the cavities of the container.

26 Claims, 4 Drawing Sheets

APPARATUS FOR SUPPORT OF LARGE SHIPPING CONTAINERS DURING FOAMING

BACKGROUND OF THE INVENTION

The present invention relates to the field of supporting shipping containers while insulating the containers with foam insulation and has particular application to large refrigerated oceanic shipping containers and refrigerated semi-truck trailers used for shipment of perishable goods.

Large quantities of perishable goods are shipped over long distances by both sea and land transport to reach their ultimate markets. In order to effectively ship such goods, which include, among other products, flowers, meat, fish, vegetables and frozen foods, refrigerated containers are essential. To control the cost of such refrigeration, the containers must be effectively insulated. Typically, the containers are metal sided, and such containers are most effectively insulated by introducing foam insulation into the hollow cavities between the inner and outer metal surfaces of the container.

The containers used for such shipments are generally 20 to 40 feet long, having widths of approximately 8 to 8½ feet and heights between 8½ and 9½ feet. The containers are often capable of being mounted on wheel systems for use on highways as tractor-trailers. Refrigerated standard length tractor-trailers, which may be as long as 53 feet, must also be insulated.

The described shipping containers are generally open at one end for access, and at the other end have a rectangular opening suitable for mounting of a refrigeration unit. Insulated doors are attached to the open end of the container after the rest of the container has been insulated.

Adequate insulation of the container walls has been a problem in the industry. This is due to the nature of the process by which fluid foam is introduced into and expands within the container cavities. Typically, the container's walls utilize an outer metal sheet, usually made of aluminum, which is spaced from an inner metal sheet of stainless steel. A series of separate hollow cavities are situated between the inner and outer sheets, and unless these cavities are effectively insulated, the metal side walls of the container will quickly conduct unwanted ambient heat into the container. Insulation is generally introduced within the cavities in fluid foam-like form to allow the insulation to flow to all parts of the cavities including the lower levels. This foam subsequently expands to fill and permanently insulate the container cavities, and solidifies soon after expansion.

To effectively insulate a container wall, it is crucial to have the foam completely fill each cavity. If, for any reason, the foam, after expansion, fails to reach a significant volume of the cavity there will be an empty void and a potentially serious thermal breach in the otherwise well insulated container. Various approaches have been tried to effectively insulate the container's lateral surface panels, namely, side panels, roof panel, and floor panel. Systems now in use utilize a jig which holds the container in an orientation where its roof panel is horizontal and the various side, roof and floor panels are injected with fluid foam insulation while the container has its roof panel horizontal. While this system is reasonably effective in insulating the lateral side panels, the foam does not flow well across the horizontal roof and floor panel cavities and an unacceptable number of uninsulated voids results.

The prior art has addressed this problem by constructing large stationary tilted fixtures which receive and insulate individual panels, such as the side panel or roof or floor panel of a container. The fixture will receive the panel in a tilted orientation and hold such panel in a tilted orientation during foaming. The uninsulated panel must be picked up, tilted, and then placed in the tilted fixture for foaming. These tilted prior art fixtures have a number of serious shortcomings. Each fixture occupies considerable floor space, and additional adjacent working space is needed to manipulate each panel to a tilted orientation and place it in the fixture. Since the container side panels are somewhat different from a roof panel and a roof panel from a floor panel, the manufacturer must either have three different fixtures to handle the three different panels or must regularly modify a single fixture to handle three different types of panels. Use of three different fixtures requires the permanent dedication of three times as much floor space. Modifying a single fixture is time consuming and disrupts steady production of insulated panels. In either situation, it requires approximately a half hour to insulate and cure a panel or a full container. Consequently, the fixtures that insulate only a single panel at a time require approximately four times as long to foam the four individual panels as does a fixture that processes the entire container at one time. Problems also arise in moving an initially level panel to the tilted orientation required for loading the large tilted panel into the pretilted unmovable fixture. When the fixture is permanently tilted, introduction of the tilted panel into the fixture is unwieldy and cumbersome. Removal of the tilted panel is also more difficult. This loading and unloading process must be repeated for each panel and will typically further slow the manufacturing process.

Another shortcoming of present container insulation apparatuses is that they do not identify the location of uninsulated voids in the container cavities. Whenever significant uninsulated voids form in the lateral surface panels of a container, it is desirable to be able to locate them and fill them. At present time, these voids are located by an inspector who seeks out the voids using a technique in which he strikes the side of the container with a club to listen for sound differences which identify the void's location. This inspection system is slow, time consuming and dependent on the alertness of the inspector, with its results being somewhat mixed. A more efficient, automated system is desirable.

BRIEF SUMMARY OF THE INVENTION

An improved container support apparatus receives and discharges shipping containers in a normal upright orientation. The apparatus, after receiving the container in an upright orientation, but before applying fluid foam insulation to the container, pivots the container to an angle suitably inclined to the horizontal to more efficiently distribute fluid foam throughout container cavities and thereby minimizes the formation of unwanted, uninsulated voids.

The present invention is a tilting apparatus for introducing foam insulation into a container to be used in shipping cargo that needs to be refrigerated. The apparatus utilizes a container supporting housing swingably mounted to a frame. The housing contains a mandrel centrally mounted within a housing chamber and extending cantileverly toward an open end of the housing. A number of heated platens are mounted within the chamber and carried by the housing and the mandrel. These platens are movable between a retracted position and a container engaging operating position in which the platens provide support to the container's lateral surface panels against deformation of the panels due to pressure generated by the expanding of foam insulation. The apparatus further includes a guide base that is positioned outside of the housing and which receives a container supporting carriage and positions the carriage for introduction into the housing chamber. The guide base utilizes guide wheels and a rack and pinion system to move the carriage and container into and out of the housing chamber. The cantilevered mandrel fits within the container interior, entering the container at its open end as the carriage and container enter the chamber. Once the container and carriage are within the housing, the carriage is raised to allow the bottom of the container to contact the bottom platen of the mandrel, and then the movable platens are moved to the container engaging operating position to support the container surface panels. The housing is next pivoted about a longitudinal axis by a plurality of hydraulic cylinders which are disposed along a side of the housing.

After pivoting the housing to an appropriate angle, preferably 15° relative to a horizontal plane, foam insulation is introduced into the cavities of the container. When foaming is complete, the housing is returned to its initial, level position, whereupon the container is removed from the housing.

The present invention eliminates the undesirable aspects of both the traditional level foaming fixture as well as of the permanently tilted foaming fixture. Introduction of the container into the housing and removal of the container from the housing is accomplished when the housing is level, yet the beneficial qualities of tilting the container for foaming are fully available. The invention is portable in the respect that it is not part of the surrounding building and may be constructed at a manufacturing site and its components transported to the installation site and assembled or later moved. An appropriate control unit coordinates the tilting of the housing, the operation of the platens, and the movement of the container into and out of the housing. A method for supporting a large shipping container during the installation of fluid foam insulation is also disclosed.

The invention utilizes a new void detection apparatus that improves the effectiveness and efficiency of void detection. The void detection apparatus includes a thermal sensor system capable of producing electrical signals indicative of the heat dissipated from the foamed container. The sensor system is positionable to allow it to scan the container surface panels as the container is removed from the housing. Such scanning is done by producing relative motion between the sensor system and the container to allow the system to scan the container in a number of successive bands. The electrical signals produced by the thermal sensor system are relayed to a system for storage and retrieval of the signals. This storage and retrieval system produces an accurate representation of all void locations and eliminates the uncertainties of human, sound based inspection.

These and other benefits of the present invention will become apparent from the following detailed description thereof taken in conjunction with the accompanying drawings.

DESCRIPTION OF THE PREFERRED EMBODIMENTS

Figure 1:
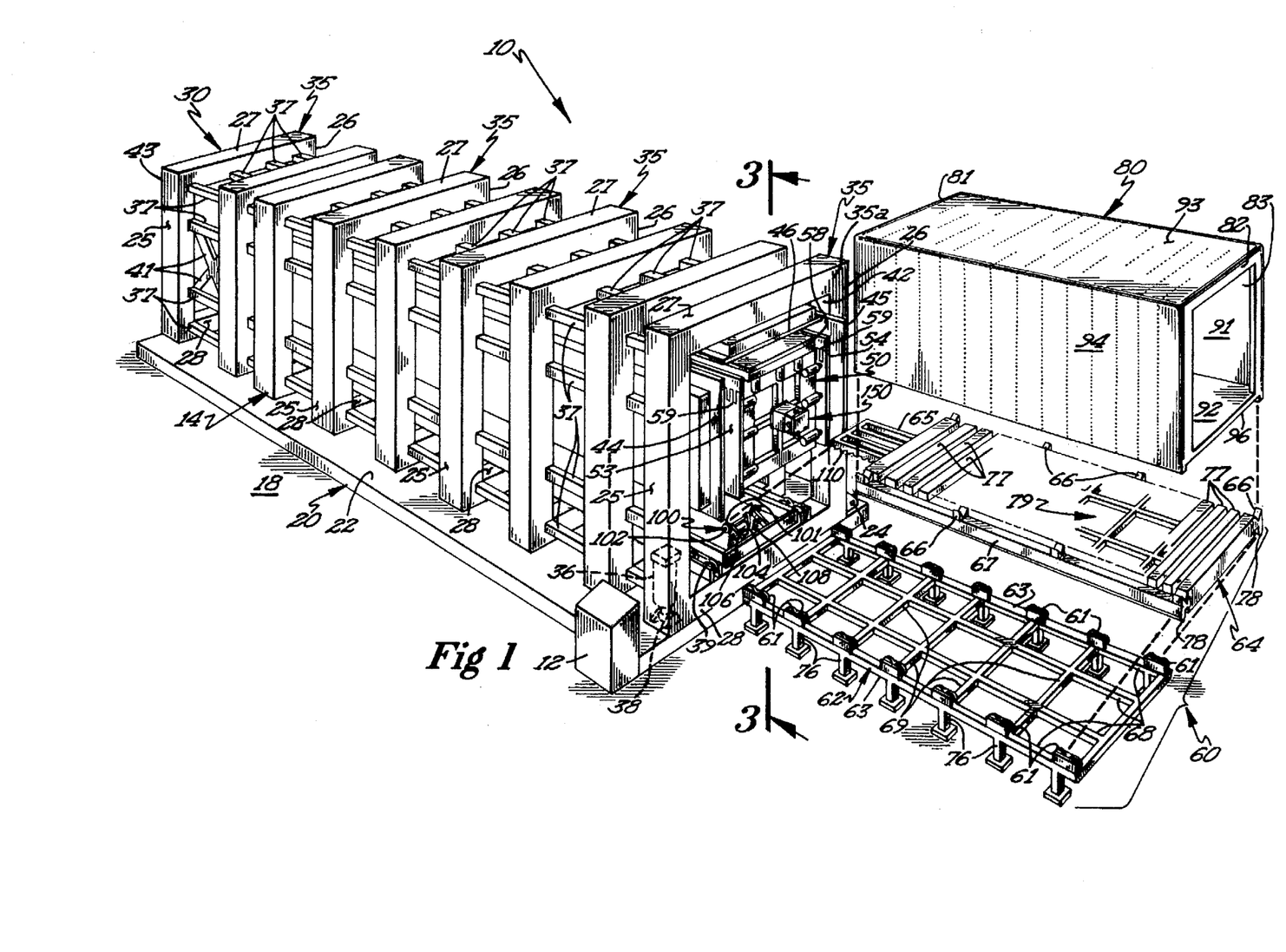
FIG. 1 is a perspective, partially exploded view of an embodiment of the invention.

Referring now to FIG. 1, an embodiment 10 of a support apparatus for use in foaming a large container 80 utilizes a stationary frame 20 to which a movable housing 30 is mounted. The term "frame" as used herein may include any suitable supporting structure such as platform 22 and may utilize a concrete pad or other floor section to which frame elements such as hinge elements 29 and hydraulic cylinder anchor units 38 may be rigidly attached.

Figure 2:
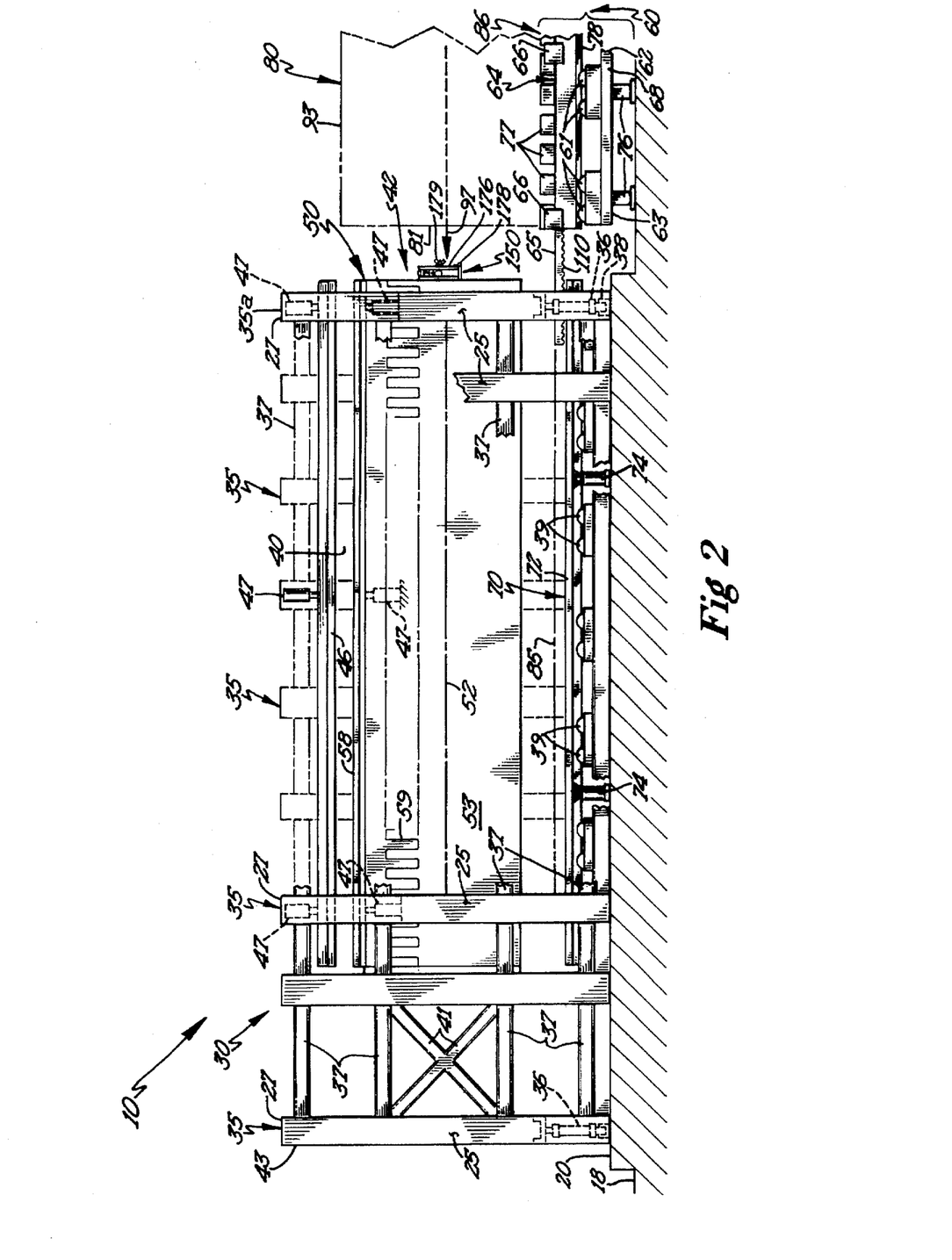
FIG. 2 is a cross sectional, front elevation view of the embodiment shown in FIG. 1 and taken partially in phantom.

The housing 30 includes a series of reinforcement columns 35 and 35a here shown as nine in number, each of which extend circumferentially around the housing perimeter. Each reinforcement column is formed from segments of steel tubing which may be further reinforced with steel plate. Each four-sided reinforcement column, as best illustrated by the column 35a at the open end 42 of the housing has left, right, top, and bottom segments 25, 26, 27 and 28, respectively, joined together by welding, bolting or other means known to the art so as to define a rigid ringlike four sided framework which encircles an interior housing chamber 40 (FIG. 2). Indications of left, right, top and bottom are in reference to the views shown in FIGS. 3–7 of the drawings. The two reinforcement columns 35, most distant from column 35a, are interconnected and braced by cross members 41. Longitudinal support members 37 interconnect the columns 35 on both side walls 31 and 32, the top wall 33 and the base wall 34 of the housing, to form a more rigid housing structure. The cross members 41, support members 37 and reinforcement columns 35 cooperate to form a substantially rigid housing 30 and define an interior chamber 40 formed between open end 42 of the housing 30 and closed end 43 of the housing. While a particular housing is illustrated as being effective with the invention, it should be understood that other housing designs capable of carrying a suitable mandrel and platens and adequately supporting the shipping container 80 during foaming may be substituted and are within the purview of the invention.

A mandrel 50 is mounted cantileverly from the closed end 43, and extends along chamber 40 toward open end 42. Mandrel 50 has a longitudinal central axis 52 generally coincident with the long axis of the apparatus 10. Longitudinal axis 52 is also substantially parallel to the path 85 (FIG. 2) along which container 80 travels into and out of the chamber 40.

Side mandrel platens 53 and 54 and top mandrel platen 58 are mounted to left face 55, right face 56, and top face 57, respectively, of the exterior 51 of mandrel 50 and similarly, housing platens 44, 45 and 46 are carried by the left, right and top, respectively, of the housing interior surface 48 so as to confront the mandrel platens. In the preferred embodiment, mandrel platens 58, 53 and 54 are carried by the top, left and right sides 57, 55 and 56, respectively, of the mandrel. Housing platens 44, 45 and 46 are movably mounted to the top 33, left side 31 and right side 32 of the housing 30. The mandrel platens and housing platens are capable of moving between the retracted positions shown in FIG. 3 wherein the mandrel platens 53, 54 and 58 and the housing platens 44, 45 and 46 are spaced apart to receive the container 80 therebetween, and the operating positions shown in FIG. 4 where all the platens bear solidly against the interior and exterior lateral surface panels of the container. The platens are moved by screw jacks 47 or other suitable means for movement.

Figures 3, 4:
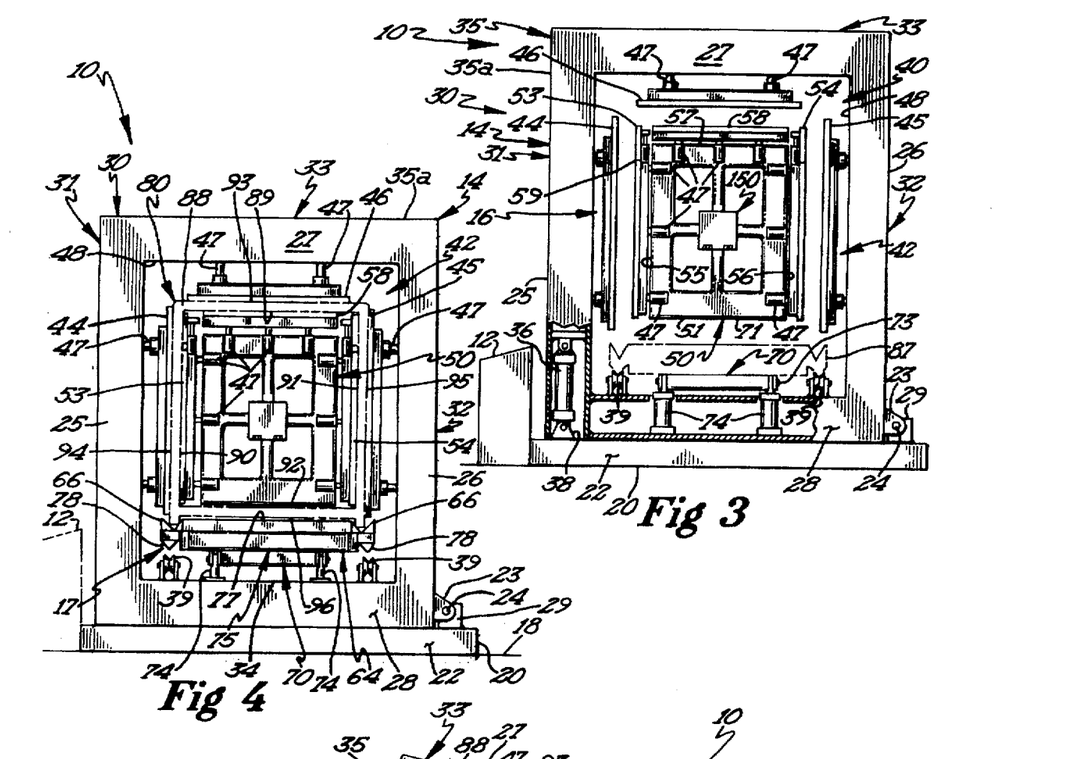
FIG. 3 is an end elevation view of the embodiment shown in FIG. 1 taken in the direction of arrows 3—3 in FIG. 1 with the mandrel and housing platens in retracted position and the housing partially cut away to show the hydraulic cylinders and the lifting rail screw jacks, and showing the carriage in phantom.
FIG. 4 is an end elevation view of the embodiment shown in FIG. 1 with a typical container therein (shown in phantom), and showing the mandrel and housing platens in their operating positions contacting the container.
Figure 7:
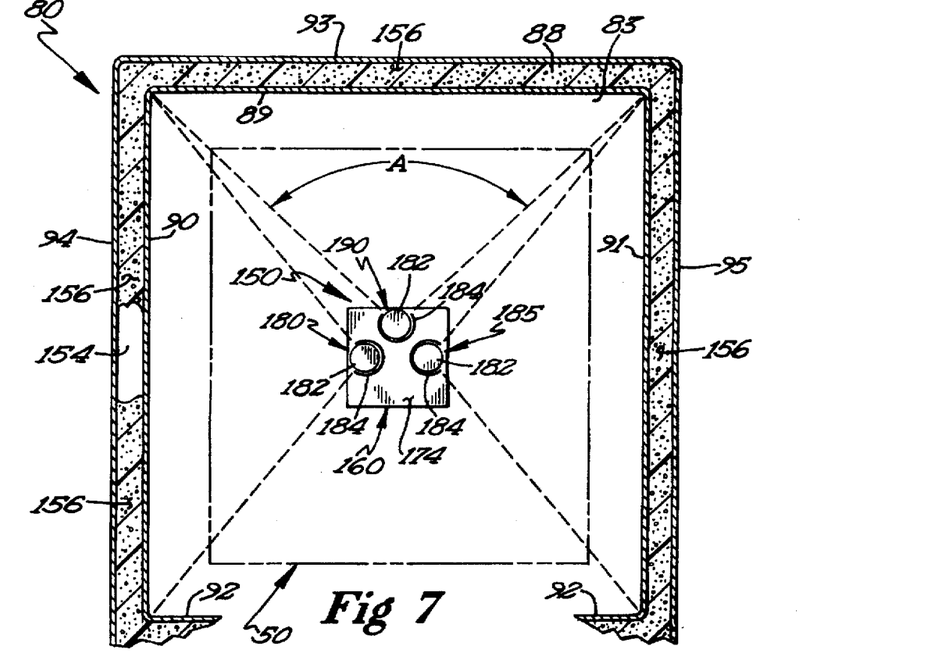
FIG. 7 is a cross sectional end view of a container which is being insulated in accord with the invention and demonstrating the detection of uninsulated voids.

Support and foaming apparatus 10 is especially useful in the support of containers having a large surface area and large cavities that require substantial foam insulation travel. Such containers include oceanic style shipping containers 20 to 40 feet long, as well as 53 foot tractor-trailers used in over the road trucking. A typical container 80 to be insulated is preassembled from interior and exterior lateral surface panels, and has one open end 81 where doors will later be attached. The opposite end 82 is provided with an end wall having a rectangular opening for placement of a refrigeration unit. The end wall will generally be added after the lateral side panels have been insulated. The container 80 has top, left, right and bottom interior surface panels 89, 90, 91 and 92, typically formed of stainless steel, and top, left, right and bottom exterior surface panels 93, 94, 95 and 96, typically formed of aluminum. The interior and exterior surface panels are separated by cavities 88 (FIG. 7), which will be filled with foam insulation 156. As used herein, the assembly of the interior and exterior surface panels separated by cavities will be referred to collectively as lateral surface panels or lateral surfaces, and refers to the entire length of container 80. A plurality of foam access openings (not shown) are disposed along the container 80 to allow foam access to all container wall cavities 88. The container construction is best shown in FIGS. 1, 4 and 7.

Side mandrel platens 53 and 54 which bear against the left and right interior vertical surface panels 90 and 91 of the container may be vertically expandable to fit the dimensions of the interior side surfaces of the container in order to accommodate varying height containers 80 to be foamed by the foaming apparatus 10. Such expandability is provided by an expansion joint 59, well known to the art and best shown in FIG. 2.

The housing platens 44, 45 and 46 and the mandrel platens 53, 54 and 58 are heated in order to control the solidifying rate of the foam insulation as it is injected into the container cavities 88. Such heating may be accomplished by any means known to the art. With the disclosed embodiment 10 it is preferred to utilize a hot water heating system, not shown, which delivers and recirculates preheated water to the platens and circulates such water with water tube serpentines, all as well known to the foam insulating art.

Referring again to FIG. 1, a guide base 62 utilizes a generally rigid steel framework of longitudinal beams 68 interconnected by cross members 69 and is supported by a multiplicity of legs 76 which may rest on either the frame 20 or the building floor as shown in the drawing. These legs provide evenly distributed support to the outermost longitudinal beams 63 to prevent significant bending thereof when loaded by the carriage 64 and container 80. Positioned along the outermost longitudinal beams, preferably directly above the legs 76, are a multiplicity of guide wheels 61 which rotatably engage the outer tracks 78 of carriage 64.

Additional guide wheels 39 are carried by the bottom horizontal segments 28 of columns 35 and 35a and are longitudinally aligned with the guide wheels 61 so as to receive and support the carriage as it enters the chamber 40. The guide wheels 39 located on the columns 35 which are crossed by the carriage as it enters and leaves the chamber permit the carriage and container to be smoothly inserted and also center the container on mandrel 50.

Carriage 64 is generally rectangular in configuration which has a base framework 79 with outer tracks 78 which roll on supporting guide wheels 61. Carriage 64 has a tongue 65 which extends within housing chamber 40. When carriage 64 is outside of housing 30 in its first carriage position 86, tongue 65 is attached to carriage power means (described hereafter) inside of housing 30 that moves carriage 64 into and out of chamber 40.

Referring now to FIGS. 1 and 2, carriage 64 carries a plurality of generally parallel carriage platen blocks 77 positioned at regular intervals along the full length of the carriage. Blocks 77 are preferably formed from aluminum, are heated similarly to the earlier described platens, are positioned transversely to the long dimension of carriage 64, and collectively define a carriage platen which bears against and supports the exterior bottom panel 96 of container 80. Although the carriage platen is shown as a series of blocks, it should be understood that a solid, continuous platform or other suitable platen device could be substituted and is within the scope of the invention. When container 80 is properly positioned on carriage 64, the movement of carriage 64 to its second carriage position 87 (FIG. 3) in chamber 40 will slide the container onto mandrel 50 causing the mandrel to largely fill the interior 83 of the container 80. To assure that container 80 will be properly positioned on carriage 64 with the container aligned to slip onto the mandrel 50, carriage 64 has, on the top of its outer beams 67, an alignment means comprising a series of "v" shaped cradles 66 into which the lower edges of the container 80 will be received. These cradles 66 center the container on the mandrel axis 52.

The carriage 64 and container 80 are moved into and out of foaming chamber 40 by a rack and pinion gear system 100. The gear system includes a pair of racks 110 mounted to the left and right sides of tongue 64 and to the underside of the framework 79 of carriage 64, the racks extending longitudinally the length of carriage 64. A spur gear assembly utilizes a set of floating spur or pinion gears 101. Each spur gear 101 continuously engages one of the racks 110 of carriage 64. The spur gears 101 are mounted to a shaft 102. Shaft 102 is driven by a selectively reversible motor 104, in order to rotate spur gears 101. Rotation of the spur gears moves the carriage 64 and container 80 into and out of the chamber 40. In order for spur gears 101 to maintain continuous contact with racks 110, shaft 102 is rotatably carried by arms 106 which are pivotally mounted within chamber 40. The arms and therefore shaft 102 and spur gears 101 are spring biased upwardly toward the racks 110 by compression springs 108. It is in this manner that spur gears 101 are kept in continuous contact with racks 110. The motor driving shaft 102 rotates spur gears 101 at a constant speed. Carriage 64 and container 80 are therefore moved into and out of chamber 40 at a constant rate of speed. The spur gears, racks, shaft, arms, motor and springs collectively define a carriage power means suitable for moving the carriage 64 along a path 85 from its first carriage position 86 outside the housing to its second carriage position 87 in which the container has been moved into the housing chamber 40 with the mandrel 50 fully received within the interior 83 of the container and the carriage 64 parallel to and centered beneath the mandrel. While a specific carriage power means has been disclosed, it should be understood that other drive mechanisms capable of achieving the required movement of the carriage may be substituted and are within the purview of the invention.

Accordingly, the described guide base 62, its guide wheels 61 and the guide wheels 39 positioned within chamber 40, along with the carriage 64, collectively define a guide means 60 for moving the container into and out of the housing chamber.

Referring now to FIGS. 2–5, positioned within and at the bottom of the chamber 40 and supported on the housing 30 is an elevator 70 which utilizes parallel, laterally spaced apart lifting rails 72 which are carried by a plurality of powered screw jacks 74 spaced along each lifting rail at regular intervals. The screw jacks 74 may be electrically or hydraulically energized and move the elevator between a rest position 73 (FIG. 3) wherein the elevator is spaced slightly from the carriage 64 when the carriage is in its second position 87 within the chamber, and an elevated buttressing position 75 (FIG. 4) wherein the elevator engages the underside of carriage 64 and elevates the carriage such that the roof of the container 80 is raised to a position where platens 46 and 58 can effectively support the roof therebetween. The elevator 70 and the jacks 74 thus collectively comprise a carriage lifting means. While screw jacks 74 are the preferred means for lifting the carriage, other suitable lifting devices may be substituted, and are within the scope of the invention.

Housing 30 is swingably mounted to frame 20 by a plurality of hinges 23 (FIGS. 3–5) connected between the frame and each of the reinforcement columns 35 to allow the housing to rotate about a pivot axis 24, and these hinges collectively define a hinge means about which the housing is moved during its operation. A plurality of hydraulic cylinders 36 are pivotally mounted between frame 20 and housing 30 along the side of housing 30 opposite that to which hinges 23 are attached. Anchor units 38 anchor hydraulic cylinders 36 to frame 20. In the preferred embodiment, cylinders 36 are mounted within the hollow interior of segments 25 of columns 35 and 35a to allow their moving rams to extend downwardly through the open bottom of vertical segments 25. It has been found helpful to position the cylinders 36 within the reinforcement column side segments because such placement provides an exceptionally solid anchor point for the upper end of the cylinder and places the cylinder in a location where it is out of the way, safely shrouded from accidental human contact, and protected from accidental damage and insulation foam spillage that occasionally occurs. Placement of the cylinders within the columns also avoids the obstruction of the spaces between the columns and allows operational access to these areas for cleaning, service and the like. When container 80 and carriage 64 have been moved into chamber 40, and all platens have established proper supporting contact with the panels of container 80, hydraulic cylinders 36 will be actuated and serve as a power tilting means to pivot housing 30 with respect to frame 20 from a first position 14 shown in FIG. 4 to an inclined second position 15 shown in FIG. 5. Housing 30 is rotated through an arc α not exceeding 25° relative to a horizontal plane 18, although best results are obtained with an angular inclination between 10° and 20° relative to a horizontal plane with the optimal angular inclination being 15° in order to obtain the most uniform fluid foam distribution in the container cavities.

Foam distribution to the container cavities may be accomplished in known fashion by the use of foaming nozzles 120 (FIG. 5) connected to supply hoses 122, with the nozzles associated with each lateral panel of the container being located at the higher edge of each such side. Because foaming nozzles 120 and supply hoses 122 are well known in the art, they are shown only in FIG. 5, and deleted from the remaining views for clarity.

A control box 12 is mounted on or adjacent to frame 20 and contains suitable hardware and software for manual and automatic control of the apparatus 10. Such hardware and software includes a programmable logic control system, and manual controls. The programmable logic control system will allow automatic movement of mandrel and housing platens coordinated with the position of container 80, as well as controlling the movement of the carriage 64 and elevator 70, the tilting of the housing 30, the actuation of the foam nozzles 120 and the operation of void detection sensors described hereafter. The expansion joints 59 will generally be manually actuated to expand or retract to properly match the height of a container 80 contained within housing chamber 40.

The apparatus 10 may also be fitted with a void detection apparatus 150 as best shown in FIGS. 1–3, 6 and 7. Void detection apparatus 150 is mounted in an open sided detector housing 170 (FIG. 6) and utilizes a thermal sensor system 160 capable of producing electrical signals indicative of the heat being received by the sensor. Thermal sensor system 160 preferably includes three infrared sensor units 180, 185 and 190 disposed within housing 170. Detector housing 170 includes a panel box 172 mounted to end 49 of mandrel 50, a front panel door 176 hinged to a forwardly extending base plate 171, and open, unobstructed left, right and top side slots defined between box 172 and door 176 when the door is in a closed position. Panel door 176 is hinged with suitable hinges 178 at its bottom to open downwardly. In the embodiment shown, the sensors are mounted to panel 174 of box 172, the box having a wider than usual side wall 173 to assure that thermal sensor system 160 is placed a sufficient distance outward from mandrel end 49 to allow thermal sensor system 160 unobstructed scanning access to the panels of container 80. The sensor mounting system may be structured in a variety of configurations provided thermal sensor system 160 remains spaced sufficiently from mandrel end 49 to allow the sensor units an unobstructed view of their respective container surface panels to be scanned. Door 176 is kept in a closed, operating position by wing nut 179 and washer 181 which engage closure screw 183.

Figure 6:
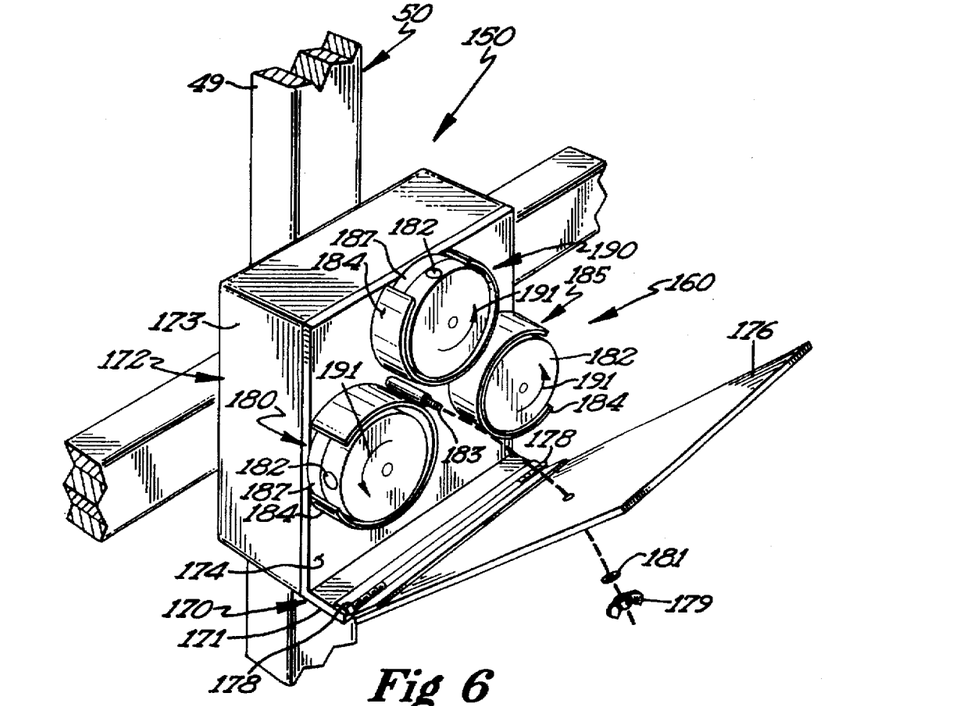
FIG. 6 is a perspective view of an embodiment of a void detection apparatus suitable for identifying uninsulated voids in the container cavities and wherein the detection apparatus is shown attached to the mandrel.

Infrared sensor units 180, 185 and 190 are mounted to plate 174, and are positioned to confront the left, right and top interior surface panels 90, 91 and 89, respectively, of container 80. The preferred positioning of each sensor 180, 185 and 190 is at a distance of approximately four feet from the container surface to be scanned and should be placed approximately midway between the horizontal edges of the panel confronted.

Each infrared sensor unit 180, 185 and 190 is a self-contained unit having an infrared sensor, an outer shade, and an internal motor. Since all of the sensor units are identical, only the sensor 180 will be described in detail. Sensor 180 has an outer shade 184 partially encircling sensor 182. The shade 184 has an opening or aperture 183 of sufficient arc A to subtend the height of the side panel 90 as best illustrated in FIGS. 6 and 7, so as to allow the sensor to detect thermal signals from its confronted surface 90. Each of the sensors 180, 185 and 190 scan an arc A which may differ somewhat in amplitude depending on the dimensions of the container 80 and the placement of the detection apparatus 150, but will typically be approximately 90°. The remainder of the shade effectively blocks thermal signals from other directions. Aperture 183 is designed, and sensor unit 180 is positioned and mounted, to allow sensor 182 to be able to operatively confront the entire surface 90 along its height.

An internal motor 187 of sensor unit 180 rotates sensor 182 in direction 191 continuously at a rate of approximately 900 revolutions per minute within the shade 184. This rotation allows the sensor to rapidly scan the entire vertical surface panel 90 at 900 times per minute. One revolution of the sensor is sufficient for scanning one band of the surface panel.

When the container 80 is removed from chamber 40 at a constant rate of speed, preferably approximately 1 foot per second, this allows the sensors to scan a multiplicity of successive bands of each surface panel 89, 90 and 91. The scanning rate of infrared sensors, approximately 900 revolutions per minute, allows thermal sensor system 160 to scan the panels in bands of approximately 0.8 inch as the container 80 is moved from the housing. The sensors detect heat dissipated from the respective panel and send corresponding signals to control box 12.

Control box 12 contains software designed to interpret the thermal signals from infrared sensors units 180, 185 and 190 and to generate a record indicative of a thermal profile of each interior container surface 89, 90 and 91 and therefore of the container cavities 88 therein. The foam used in insulating containers of the type envisioned to be used with the apparatus 10 is exothermic. Upon expansion, the foam releases heat. The infrared sensors of void detection apparatus 150 systematically detect heat dissipated from all the interior surface panels 89, 90 and 91. Where foam expansion has uniformly filled a cavity such as cavity 88 in FIG. 7, the thermal conditions detected by the pertinent infrared sensor and interpreted by the software will be uniform. However, uninsulated voids such as void 154 (FIG. 7) will not emit the same amount of heat as areas that are properly insulated. This lower heat emission will be detected by the infrared sensors and interpreted as an uninsulated void by the software. The software in control box 12 will generate a graph which is, in essence, a "fingerprint" of the insulation density in the cavities 88 of container 80. This apparatus and method for detecting voids is more efficient and more accurate than present void detection methods.

The shown positioning of sensor units 180, 185 and 190 to confront the interior surface panels 90, 91 and 89 of container 80 is preferred. The reason for this is that the interior panels of container 80 are typically made of stainless steel, whereas the exterior panels 93–95 are typically aluminum. The thermal properties of stainless steel make it a better surface to scan when detecting inadequately insulated voids 154 within cavities 88 of container 80. Stainless steel has a lower conductivity than aluminum and therefore does not dissipate heat to cooler portions of a panel as rapidly as aluminum. This lower conductivity creates a sharper void profile. Rapid "evening out" of heat over a panel surface could lessen the sensitivity of void detection apparatus 150, which is the reason the sensors are positioned to confront the stainless steel surfaces.

Figure 5:
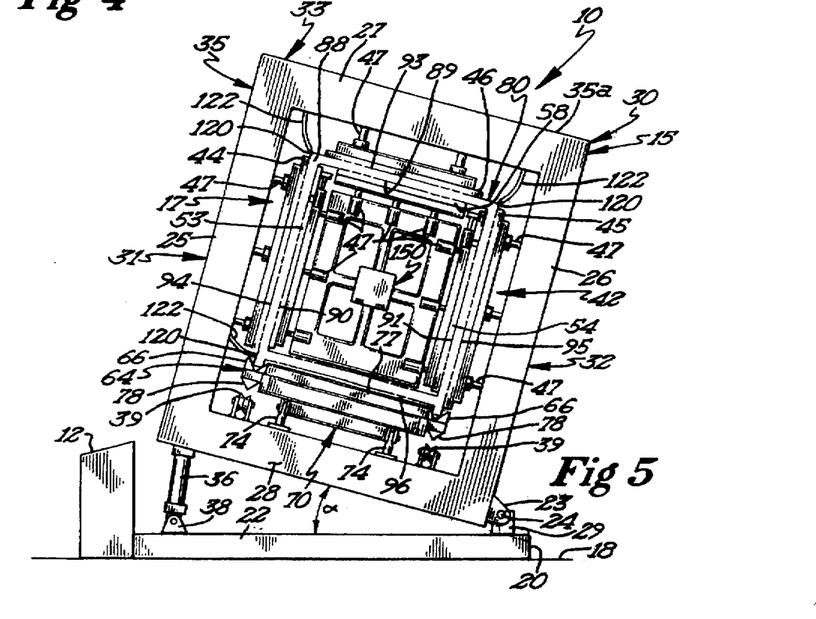
FIG. 5 is an end elevation view of the embodiment shown in FIG. 1 with the housing in its second, inclined position for foaming of the container and showing the container in phantom.

In operation, a container 80 is first placed on top of carriage 64 in a generally upright vertical position with the carriage 64 in its first position 86 outside chamber 40 on guide base 62. As the container 80 is placed on the carriage, the lower edges of its vertical sides are positioned within aligning cradles 66 to assure that the container is properly positioned to enter the chamber 40. This initial container orientation, wherein the container is substantially level, allows easy loading, unloading, and smooth introduction into housing 30. The rack and pinion system 100, described earlier, moves carriage 64 smoothly into housing chamber 40 along path 85 in direction 97 at a constant speed with the carriage tracks 78 sliding smoothly on guide wheels 61 and 39. When carriage 64 and container 80 have been moved to the second carriage position 87 within housing chamber 40, elevator 70 moves from is first, lowered position 73 to a buttressing position 75, lifting an elevated the carriage and moving it from position 87 to elevated position 87a in which floor panels 92 and 96 of container 80 are sandwiched between bottom mandrel platen 71 and carriage platen blocks 77. Once the floor of container 80 is properly contacting mandrel platen 71, all the remaining platens are moved from their retracted positions 16 shown in FIG. 3 to their operating positions 17 contacting the interior and exterior surface panels of container 80 as shown in FIG. 4 and 5 so as to prevent unwanted deformation of the container during the foaming of the cavities. Expansion joints 59 on mandrel platens 53 and 54 allow these platens to elongate or contract vertically in order to better fit containers having side walls of differing heights.

When all platens have been moved to their proper contacting positions 17, the hydraulic cylinders 36 are actuated, causing housing 30 to be pivoted about axis 24 to inclined position 15, wherein the container is tilted to an angle α of substantially 15° relative to a horizontal plane 18, as best shown in FIG. 5. Although an angle relative to the horizontal plane 18 of 15° is preferable, effects beneficial to the foaming process can also be obtained over a range of angles α of between 5° and 25° relative to the horizontal plane. With container 80 and housing 30 in tilted position 15, fluid foam insulation is introduced into cavities 88 of container 80 through hoses 122 and foaming nozzles 120. After the fluid foam insulation 156 has cured, the cylinders 36 are again actuated to lower the housing 30 to its initial level position 14. Next screw jacks 74 are lowered so as to have elevator 70 return carriage 64 and container 80, to the rest position 87 within housing chamber 40. The screw jacks 47 are then actuated to move the mandrel and housing platens from their operating positions 17 contacting container 80 to the retracted positions 16 shown in FIG. 3. The rack and pinion system 100 next moves carriage 64 and container 80 along a level path 85 from position 87 within housing chamber 40 to outside position 86, such movement occurring at a constant velocity of approximately one foot per second.

Void detection apparatus 150 is actuated as the carriage begins moving from position 87 to outside position 86 and scans the interior surface panels 89, 90 and 91 of container 80 looking for cooler portions of the panel associated with voids such as void 154. Referring to FIG. 7, sensor 182 will scan panel 90 and the heat dissipated from panel 90 will indicate the presence and position of void 154. Sensor 185 will scan panel 91 and the heat dissipated from panel 91 will indicate the presence of a uniform layer of insulation 156. The infrared sensor units 180, 185 and 190 continually scan the surface panels in bands of about 0.8 inch width, measuring the heat dissipated and sending electrical signals to control box 12 and its related software. The software interprets the signals sent from the infrared sensors and stores the resulting "fingerprint" of the insulation of container 80. When scanning is complete, the void detection software can generate a visual image of the insulation·layer on each side, and top of the container, and note the position of any voids 154 therein. Introduction of foam insulation 156 into these voids can be readily accomplished by known methods. Although no void detector is here shown as inspecting the floor of the container, an additional detector can be added for that purpose, if desired, and is within the purview of the invention.

The detailed description outlined above is considered to be illustrative only of the principles of the invention. Numerous changes and modifications will occur to those skilled in the art, and there is no intention to restrict the scope of the invention to the detailed description. The preferred embodiments of the invention having been described in detail, the scope of the invention will be defined by the following claims.

What is claimed is:

1. An apparatus for support of an oceanic style shipping container during the installation of fluid foam insulation in cavities within the hollow lateral surface panels of the container, the container having an interior, said apparatus comprising:

a substantially rigid frame;

a substantially rigid housing mounted to said frame and having left and right side walls, a top wall and a base collectively defining an interior central chamber therebetween, said housing having an open end to allow movement of the container into and out of said chamber;

an elongated mandrel mounted within said chamber, capable of fitting within the interior of the container, extending cantileverly toward said open end of said housing, and having a longitudinal mandrel axis extending in the direction of cantilevered extension;

a plurality of platens operatively mounted to said housing and said mandrel, certain of said platens being mounted for selective movement between a retracted position wherein said platens are spaced from the container when the container is within said chamber and an operating position wherein said plurality of platens contact and support the lateral surface panels of the container;

guide means including a guide base and a carriage movably mounted on said guide base, to move the container along a path into and out of said chamber, said carriage including a carriage platen capable of supporting the container;

carriage power means connected with said carriage to move said carriage between a first carriage position outside said housing chamber and a second carriage position within said housing chamber;

said housing being movably mounted relative to said frame to move between a first housing position and a second housing position, said second housing position being inclined relative to a horizontal plane to encourage movement of fluid foam insulation throughout the cavities of the container panels to inhibit formation of inadequately insulated voids therein; and power tilting means for moving said housing between said first housing position and said second housing position.

2. The apparatus of claim 1, and further comprising:

alignment means on said guide means for positioning the container on said carriage to position the container parallel to said mandrel axis so the container can be moved into said housing chamber.

3. The apparatus of claim 1 wherein said power tilting means is a plurality of hydraulic cylinders connected between said housing and said frame.

4. The apparatus of claim 3 wherein said cylinders are positioned along one said side wall of said housing.

5. The apparatus of claim 1 wherein said power tilting means for moving said housing is a plurality of hydraulic cylinders, said cylinders positioned substantially within one said side wall of said housing and connected between said housing and said frame.

6. The apparatus of claim 1 wherein said top wall, base, and left and right side walls of said housing include a plurality of reinforcement columns circumferentially surrounding said chamber and spaced from one another along said mandrel axis.

7. The apparatus of claim 6 wherein said power tilting means for moving said housing is a plurality of hydraulic cylinders, each said cylinder positioned substantially within one of said reinforcement columns and along a common said side wall.

8. The apparatus of claim 1 wherein the angular separation between said first and second housing positions does not exceed 25°.

9. The apparatus of claim 1 wherein the angular separation between said first and second housing positions does not exceed 20°.

10. The apparatus of claim 1 wherein said movably mounted housing is movable relative to said frame through an arc of substantially 15 degrees relative to a horizontal plane.

11. The apparatus of claim 1 wherein the angular separation between said first and second housing positions is approximately 15°.

12. The apparatus of claim 11 wherein said movably mounted housing is swingable about a pivot axis which is located adjacent the intersection of one of said side walls of said housing and said base of said housing.

13. The apparatus of claim 1, and further comprising:

carriage lifting means for raising said carriage between said second carriage position and a third carriage position wherein said carriage is elevated relative to said second carriage position.

14. The apparatus of claim 13, wherein:

said carriage lifting means includes an elevator positioned within said chamber, and being movable between a rest position wherein said elevator is spaced slightly from said carriage when said carriage is in said second carriage position and a buttressing position wherein said elevator engages said carriage and supports said carriage when said carriage is in said third carriage position.

15. The apparatus of claim 14 wherein said lifting means includes a plurality of lifting rails and a plurality of jacks connected between said rails and said housing.

16. A support apparatus for use while applying fluid foam insulation to cavities within the lateral surface panels of a container, said apparatus comprising:

a substantially rigid frame;

a substantially rigid housing movably mounted to said frame, and said housing including a foaming chamber;

an elongated mandrel cantileverly mounted within said chamber;

a plurality of platens positioned within said chamber to control deformation of the lateral surface panels of the container when the container is within said chamber; and power tilting means for moving said housing relative to said frame from a first housing position to a second housing position inclined relative to a horizontal plane.

17. A support apparatus for use while applying fluid foam insulation to cavities within the lateral surface panels of a container, said foaming apparatus comprising:

a substantially rigid frame;

a substantially rigid housing carried by said frame, said housing movably mounted relative to said frame, and including a foaming chamber;

an elongated mandrel mounted cantileverly within said chamber;

a plurality of platens within said chamber to control deformation of the lateral surface panels of the container when the container is within said chamber;

power tilting means for moving said housing relative to said frame from a first housing position to a second housing position inclined relative to a horizontal plane; and a void detection apparatus for detection of inadequately insulated voids in the cavities of the foamed container.

18. The apparatus of claim 17, and further including a carriage capable of supporting the container and mounted for movement along a predetermined path into and out of said chamber.

19. The apparatus of claim 18 and further including carriage power means to move the container into and out of said chamber at a substantially constant speed.

20. The apparatus of claim 19 wherein said void detection apparatus comprises:

a thermal sensor positioned adjacent said predetermined path to confront a panel, said sensor producing electrical signals indicative of the heat sensed; and means for storage and retrieval of said signals, said means for storage and retrieval operatively connected to receive said signals from said sensor.

21. The apparatus of claim 20 wherein said sensor is approximately four feet from said path.

22. The apparatus of claim 18 wherein the lateral surface panels of the container include a top panel, and left and right side panels, and wherein:

said void detection apparatus comprises first, second and third thermal sensors;

said first sensor positioned a predetermined distance from the locus of the container top panel as the container moves along said predetermined path;

said second sensor positioned a predetermined distance from the locus of the left side panel as the container moves along said predetermined path;

said third sensor positioned a predetermined distance from the locus of the right side panel as the container moves along said predetermined path;

each said sensor producing electrical signals indicative of the heat sensed at the panel confronting the said sensor; and means for storage and retrieval of said signals, said means for storage and retrieval operatively connected to receive said signals from said sensors.

23. The apparatus of claim 22 wherein each said predetermined distance is approximately four feet.

24. The apparatus of claim 22 wherein each said sensor is pivotally mounted.

25. The apparatus of claim 24 and further including means for pivoting each said sensor at a rate sufficient to periodically scan its respective surface panel in bands of approximately 0.8 inch width as the container moves along said path.

26. The apparatus of claim 22 wherein:

each said sensor is pivoted for periodic scanning motion; and means for pivoting each said sensor at a rate sufficient to scan its respective surface panel in bands of approximately 0.8 inch width as the container moves along said path.

* * * * *